J. P. Peters,
Counting Pills.
No. 1,202.                Patented June 27, 1839.
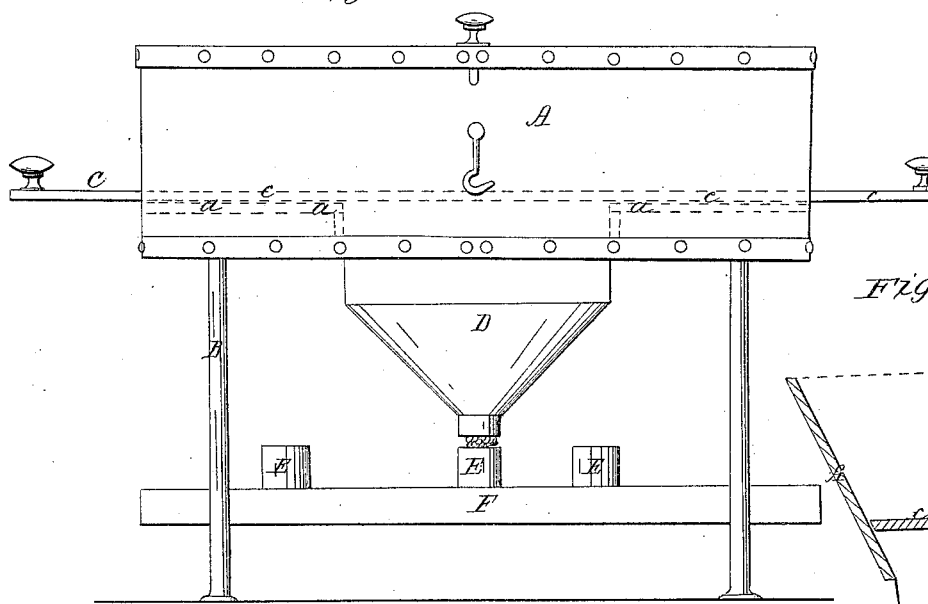
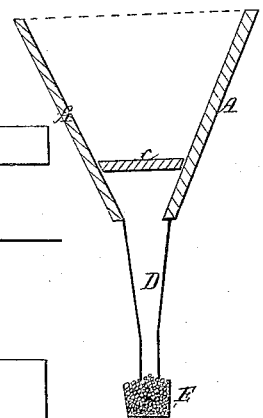
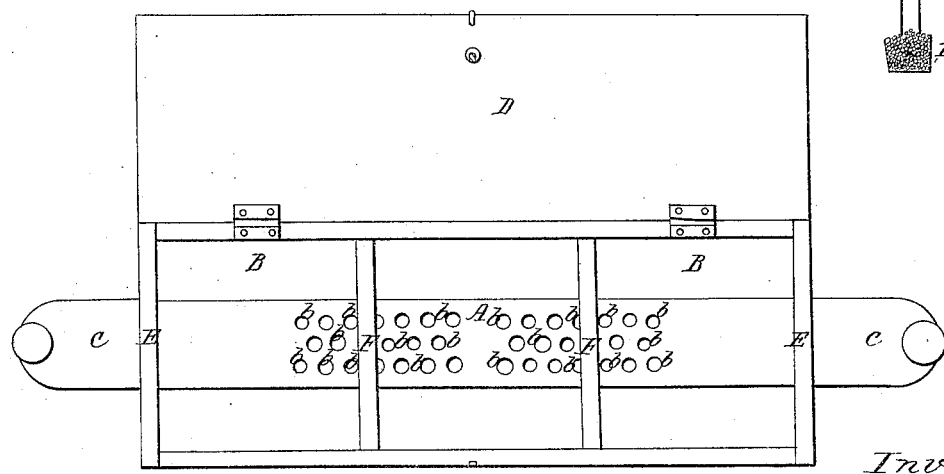
Witnesses:
Geo. T. Bates
G. A. Lonnsbery
Inventor:
J. Priestley Peters M.D.

UNITED STATES PATENT OFFICE.

JOS. PRIESTLEY PETERS, OF NEW YORK, N. Y.

MODE OF COUNTING PILLS OR OTHER ROUND SUBSTANCES.

Specification of Letters Patent No. 1,202, dated June 27, 1839.

*To all whom it may concern:*

Be it known that I, JOSEPH PRIESTLEY PETERS, of the city of New York, have invented a new and useful Machine for Counting Spherical Substances, such as Pills, Shot, and other Articles Which are Equal or Nearly Equal in Size; and I do hereby declare that the following is a full and exact description thereof.

I make a trough, or box, which I divide into three or more compartments by partitions extending from one side of it to the other; the two end compartments, when there are three only, constitute hoppers into which the pills or other substances to be counted are to be put. To this trough I adapt a sliding bottom, which is perforated with holes, the thickness of said bottom, and the diameter of the holes being governed by the size of the substance to be counted. When the perforated part of the bottom is made to occupy the lower part of one of the hoppers, one of the spherical bodies contained in said hopper will fall into each of the holes, or perforations, and may be carried, by the sliding of the bottom, into the center division of the trough or box, whence each of them is to fall, and be conducted by means of a suitable funnel, into a box placed below it to receive them.

In the accompanying drawing A, Figure 1, is the exterior of the box, or trough, standing upon the legs B, B. The sliding bottom is shown as projecting out at each end, at C, C, its place within the trough being indicated by the dotted lines *c*, *c*.

D, is the funnel by which the substances are to be conducted into the boxes E, E, which may be placed in a row upon a slide F, by the shifting of which they may be brought successively under the funnel, and be filled with the designated number of pills, or other substances.

Fig. 2, is a top view of the trough, or box, in which A, is the center division, standing immediately over the funnel, and B B are the hoppers to contain the pills, or other substances to be counted.

C C is the sliding bottom, and D, is a lid, which may be used, if preferred. The sliding bottom C, C, slides freely through slots, or openings, in the ends E, E, of the trough.

F, F, are the partitions which extend from side to side of the trough, and reach down so as to be very nearly in contact with the sliding bottom C, C, thus admitting it to pass back and forth under them, but detaining all the contents of the hoppers within them, excepting the spherical substances contained in each of the perforations in the false bottom. Beneath the sliding bottom, under the hoppers B, B, there are stationary, or fixed bottoms, shown by the dotted lines *a*, *a*, Fig. 1; these serve to sustain the spherical bodies until they have passed under the partitions into middle division, where, being unsupported, they fall freely into the receptacle placed to receive them.

Fig. 3, is a vertical cross section of the box, or trough, through its center; A, A, being the sides of it, C, the sliding bottom, D, the funnel, and E, the box to receive the counted articles.

In Fig. 2, *b b b* are the perforations in the sliding bottom, there being, as represented in the drawing, two sets of such perforations, twenty in each set; and when by sliding the bottom so that all the perforations in one set are brought within one of the end hoppers to receive a new charge, those of the other set will have been brought into the middle division, and will there discharge their contents.

The number of holes, and the size of the whole machine may be varied to any desired extent; the number of divisions also may be increased, so as to fill several boxes, or receptacles, at the same time. The sliding bottom, and the slide below the funnel upon which the receiving boxes are to be placed, may be moved by hand, or worked by a crank or other motion, as may be preferred. The form of the whole machine, also, may be changed without varying the principle of its operation; as for example, instead of using a straight sliding bottom, with perforations to separate and count the required number of spherical substances, a continuous hollow cylinders might be constructed of the proper thickness, and with the necessary perforations, and be made to act by a vibrating, or by a rotary motion, so as to produce a similar result.

Having thus fully described the construction of my machine for counting pills, or other spherical bodies, and explained the manner in which the same operates,—what I claim as my invention, and desire to secure by Letters Patent, is—

The manner of separating and counting the proper number of such bodies by causing them to be received within perforations prepared for and adapted to them, whether in a sliding, vibrating, or rotating portion of the machine, so arranged as to operate substantially in the manner of the sliding bottom and its appurtenances herein described, by means of which they are conveyed from a hopper, or compartment in which they are placed, and delivered into a funnel, and by that converted into the boxes, or other receptacle, arranged for that purpose, as set forth.

JOS. PRIESTLEY PETERS.

Witnesses:
  MERIT WELTON,
  ISAAC CARR.